US008824367B2

(12) United States Patent
Hou

(10) Patent No.: US 8,824,367 B2
(45) Date of Patent: Sep. 2, 2014

(54) METHOD AND APPARATUS FOR RECEIVING PAGING INFORMATION

(75) Inventor: Qingzhu Hou, Shanghai (CN)

(73) Assignee: Spreadtrum Communications (Shanghai) Co., Ltd., Shanghai (CN)

(*) Notice: Subject to any disclaimer, the term of this patent is extended or adjusted under 35 U.S.C. 154(b) by 420 days.

(21) Appl. No.: 13/105,595

(22) Filed: May 11, 2011

(65) Prior Publication Data

US 2012/0051285 A1 Mar. 1, 2012

(30) Foreign Application Priority Data

Aug. 26, 2010 (CN) .......................... 2010 1 0267296

(51) Int. Cl.
*H04W 4/00* (2009.01)
*H04W 68/00* (2009.01)
(52) U.S. Cl.
CPC .................................... *H04W 68/00* (2013.01)
USPC ........................................................ 370/328
(58) Field of Classification Search
USPC ........................................................ 370/328
See application file for complete search history.

(56) References Cited

U.S. PATENT DOCUMENTS

2012/0172029 A1* 7/2012 Lai et al. .................... 455/422.1
2012/0264390 A1* 10/2012 Clevorn et al. ............... 455/313

FOREIGN PATENT DOCUMENTS

| CN | 101198136 A | 6/2008 |
| CN | 101217747 A | 7/2008 |
| CN | 101313615 A | 11/2008 |
| WO | WO 2011/092254 A1 * | 8/2011 |

* cited by examiner

*Primary Examiner* — Noel Beharry
(74) *Attorney, Agent, or Firm* — Kilpatrick Townsend & Stockton LLP

(57) ABSTRACT

A method for receiving paging information, including acquiring free time information of a traffic card and occupation time information for receiving paging information of a non-traffic card; and when occupation time for receiving paging information of the non-traffic card is not in conflict with free time of the traffic card, receiving paging information of the non-traffic card on the free time. Based on the above method, an apparatus for receiving paging information is provided. Paging information of a non-traffic card can be received when the traffic card is in traffic, which helps identify if the non-traffic card has incoming service (i.e. incoming traffic).

20 Claims, 4 Drawing Sheets

METHOD AND APPARATUS FOR RECEIVING PAGING INFORMATION

CROSS REFERENCE TO RELATED APPLICATIONS

The present application claims the priority of Chinese Patent Application No. 201010267296.5, entitled "Method and Apparatus for Receiving Paging Information", and filed on Aug. 26, 2010, the entire disclosure of which is incorporated herein by reference.

BACKGROUND OF THE INVENTION

1. Field of the Invention

The present invention relates to communication field, more particularly, relates to method and apparatus for receiving paging information.

2. Description of Prior Art

With the rapid development of communication technology, interpersonal information communication becomes more frequent. Sometimes, one cell phone is not enough, especially for those working in the fields of sales and management, and people need two, three or more cell phones at the same time. However, it is not convenient to carry many cell phones, which leads to the emergence of multi-card multi-standby cell phone. The multi-card multi-standby cell phone has only one phone body, but multiple SIM (Subscriber Identity Module/UIM, User Identity Model) card, which is much more convenient compared with carrying multiple cell phones.

Globe System of Mobile Communication (GSM) is the most widely used mobile communication system in the world. In GSM network, if a user needs multiple cell phone numbers for one cell phone, there are several options:

1. Multi-card single-standby system: one cell phone can take two or more than two SIM cards, while only one SIM card can be in service (in traffic) at a time. A hardware circuit is used to switch cards, and normally the single-standby card is selected after power-on. Normally, multiple SIM cards in the cell phone can not be dynamically switched in working mode because of protocol stack, and it is required to reboot the cell phone system (mainly to start the cell phone's protocol stack/upper layer software, etc.) to switch cards.

2. Multi-card multi-standby system: the multi-card multi-standby system overcomes the limitation of the conventional multi-card single-standby system, which enables multiple SIM cards in one cell phone to be in service (in traffic) at the same time. The multi-card multi-standby system is similar to multiple cell phones, which is much more useful than multi-card single-standby system.

In the early time, a multi-card multi-standby cell phone contains multiple communication systems (normally two communication systems), each of which includes respective radio frequency, base band and protocol stack. The multi-card multi-standby cell phone which contains multiple communication systems achieves simultaneously standby and service for multiple phone numbers, which can also be named as a multi-card multi-standby multi-pass system. However, multiple communication systems add costs and power consumption to cell phones, and require more space inside cell phones which leads to large phone size and inconvenience. For RF modules, because of co-channel interference, one RF module is normally placed on the top of a cell phone and the other at the bottom to reduce interference. The distance between the two antennas should be more than 100 millimeters.

Later multi-card multi-standby cell phones can be named as multi-card multi-standby single-pass system. Compared with the above system which contains multiple communication systems, the multi-card multi-standby single-pass system has only one communication unit. The multi-card multi-standby single-pass system requires upper layer protocol stack to work together by close integration. Although being complicated, the multi-card multi-standby single-pass system achieves multi-card multi-standby effect by monitoring paging information in turn under the control of protocol stack.

However, since there is only one communication unit, only one SIM card is able to use the communication unit to communicate with base station at a time, while other SIM cards are waiting. That is to say, when network sends paging information to the cell phone, only one SIM card is monitoring the paging information at a time. Therefore, it is possible for waiting SIM cards to miss paging information.

Chinese patent application No. 200780000267.9 discloses a transmitting method and a receiving method for wireless signal. When quality of user link is lower than the predetermined low threshold, using idle time slot on other carriers corresponding the user initial occupying carrier slot in the current cell to transmit/receive user signals; when quality of the user link is higher than the predetermined upper threshold, releasing the time slot of the user occupying on the other carriers. Using these methods, the quality of the user link is enhanced while saving network resource. However, it is unable to receive paging information by these methods. These methods are unable to help identify if the waiting SIM cards have incoming service (incoming traffic).

SUMMARY OF THE INVENTION

The present invention is to solve the problem that paging information of a non-traffic card can not be received when a traffic card is in traffic in conventional technology, which is unable to help identify if the non-traffic card has incoming service (incoming traffic).

From the first aspect of the present invention, a method for receiving paging information is provided, which includes: acquiring free time information of a traffic card and occupation time information for receiving paging information of a non-traffic card; and when occupation time for receiving paging information of the non-traffic card is not in conflict with free time of the traffic card, receiving paging information of the non-traffic card on the free time.

Optionally, the acquiring free time information of the traffic card includes: acquiring traffic frame boundary time-point on a traffic channel of the traffic card and traffic frame finish time-point calculated with the traffic frame boundary time-point and time of each frame, time between the traffic frame finish time-point and the traffic frame boundary time-point on the traffic channel of the traffic card being the free time of the traffic card; and the acquiring occupation time information for receiving paging information of the non-traffic card includes: acquiring control frame boundary time-point on a control channel of the non-traffic card and control frame finish time-point calculated with the control frame boundary time-point and time of each frame, time between the control frame boundary time-point and the control frame finish time-point on the control channel of the non-traffic card being the occupation time for receiving paging information of the non-traffic card.

Optionally, occupation time for receiving paging information of the non-traffic card is not in conflict with free time of the traffic card includes: occupation time for receiving paging information of the non-traffic card being within the free time of the traffic card.

Optionally, the free time of the traffic card includes protecting time, the protecting time being used to guarantee stabilization time for switching frequency point; and occupation time for receiving paging information of the non-traffic card is not in conflict with free time of the traffic card further includes: occupation time for receiving paging information of the non-traffic card not occupying the protecting time.

Optionally, occupation time for receiving paging information of the non-traffic card not occupying the protecting time is determined by the control frame boundary time-point on the control channel of the non-traffic card.

Optionally, occupation time for receiving paging information of the non-traffic card not occupying the protecting time is determined by the control frame boundary time-point on the control channel of the non-traffic card includes: calculating control frame finish time-point with the control frame boundary time-point on the control channel of the non-traffic card and time of each frame, determining that occupation time for receiving paging information of the non-traffic card does not occupy the protecting time when the control frame boundary time-point or the control frame finish time-point on the control channel of the non-traffic card is not within the protecting time.

Optionally, the method further includes: after receiving paging information of the non-traffic card on the free time, analyzing the paging information and acquiring non-traffic card information in the paging information.

Optionally, the method further includes: after acquiring non-traffic card information in the paging information, sending prompt information.

Optionally, a number of the traffic card is one, and a number of the non-traffic card is one or more than one.

Optionally, a communication network of the traffic card and the non-traffic card is a TDMA communication network.

From the second aspect of the present invention, an apparatus for receiving paging information is provided, which includes: a storage unit, a conflict detection unit, a control unit and an I/O unit; the storage unit being adapted to store free time information of a traffic card and occupation time information for receiving paging information of a non-traffic card; the conflict detection unit being adapted to acquire free time information of the traffic card and occupation time information for receiving paging information of the non-traffic card from the storage unit, and adapted to detect conflict between the occupation time for receiving paging information of the non-traffic card and the free time of the traffic card; the control unit being adapted to control the I/O unit to receive paging information of the non-traffic card on the free time when occupation time for receiving paging information of the non-traffic card is not in conflict with the free time of the traffic card; the I/O unit being adapted to receive paging information of the non-traffic card under a control of the control unit.

Optionally, acquiring the free time information of the traffic card by the conflict detection unit includes: acquiring traffic frame boundary time-point on a traffic channel of the traffic card and traffic frame finish time-point calculated with the traffic frame boundary time-point and time of each frame, time between the traffic frame finish time-point and the traffic frame boundary time-point on the traffic channel of the traffic card being the free time of the traffic card; and acquiring the occupation time information for receiving paging information of the non-traffic card by the conflict detection unit includes: acquiring control frame boundary time-point on a control channel of the non-traffic card and control frame finish time-point calculated with the control frame boundary time-point and time of each frame, time between the control frame boundary time-point and the control frame finish time-point on the control channel of the non-traffic card being the occupation time for receiving paging information of the non-traffic card.

Optionally, occupation time for receiving paging information of the non-traffic card is not in conflict with free time of the traffic card includes: occupation time for receiving paging information of the non-traffic card being within the free time of the traffic card.

Optionally, the free time of the traffic card includes protecting time, the protecting time being used to guarantee stabilization time for switching frequency point; and occupation time for receiving paging information of the non-traffic card is not in conflict with free time of the traffic card further includes: occupation time for receiving paging information of the non-traffic card not occupying the protecting time.

Optionally, occupation time for receiving paging information of the non-traffic card not occupying the protecting time is determined by the control frame boundary time-point on the control channel of the non-traffic card.

Optionally, occupation time for receiving paging information of the non-traffic card not occupying the protecting time is determined by the control frame boundary time-point on the control channel of the non-traffic card includes: calculating control frame finish time-point with the control frame boundary time-point on the control channel of the non-traffic card and time of each frame, determining that occupation time for receiving paging information of the non-traffic card does not occupy the protecting time when the control frame boundary time-point or the control frame finish time-point on the control channel of the non-traffic card is not within the protecting time.

Optionally, the apparatus further includes an analyzing unit, the analyzing unit being adapted to analyze received paging information of the non-traffic card and acquire non-traffic card information in the paging information.

Optionally, the apparatus further includes an information prompting unit, the information prompting unit being adapted to send prompt information after the analyzing unit analyzes received paging information of the non-traffic card and acquires the non-traffic card information in the paging information.

Optionally, the apparatus for receiving paging information is a multi-card multi-standby mobile communication apparatus.

Optionally, the apparatus for receiving paging information is a triple-card triple-standby cell phone.

In comparison with conventional technologies, the present invention has the following advantages:

By using free time of a traffic card, paging information of a non-traffic card can be received when the traffic card is in traffic, which helps identify if the non-traffic card has incoming service (incoming traffic).

DETAILED DESCRIPTION OF THE EMBODIMENTS

Embodiments to which the present invention is applied are described in detail below. However, the invention is not restricted to the embodiments described below.

The present invention applies to TDMA (Time Division Multiple Access) communication network, such as GSM communication network. The present invention will be described in detail below with reference to embodiments in GSM communication network. The present invention applies to multi-card multi-standby single-pass system (which has only one communication unit but multiple SIM cards). The SIM card in traffic is named as traffic card, and others named as non-traffic card. Upon finishing communication, the SIM card, which named traffic card, is then named non-traffic card. The service provided by a traffic card includes voice service and data service. The voice service includes conventional making a phone call and receiving a phone call; and the data service includes short message service and interne access service.

When a traffic card is in traffic (using the communication unit), such as receiving a phone call, if the time for a non-traffic card to receive data is not in conflict with the time for the traffic card to receive the phone call, the cell phone is able to receive the paging information of the non-traffic card. By receiving the paging information of the non-traffic card, incoming service (i.e. incoming traffic) for the non-traffic card can be identified while the traffic card is in traffic.

For a better understand of the present invention, the frame structure of GSM communication network is described briefly here. One skilled in the art knows that a TDMA frame includes eight time slots, and one time slot is one physical channel. Physical channels can be reused by reusing the time slots, which forms logical channel. When a user is in a communication service (the SIM card which is in traffic now is named traffic card), physical channels is to be applied. After receiving the application, a base station in a cell allocates a physical channel or physical channels for the user. The user will use or occupy at least one time slot (some services like voice service are two-way services, which uses two time slots), therefore, those time slots which are not used or occupied by the traffic card are free time slots (those time slots which are not used or occupied by the traffic card may already be, or will be used by other users). The time slots which are not used or occupied form the free time of the traffic card.

In embodiments of the present invention, when a traffic card is in traffic (in service or communication status), an incoming service (incoming traffic) for a non-traffic card can be identified by receiving paging information of the non-traffic card on the free time of the traffic card.

Hereunder, the present invention will be described in detail with reference to embodiments, in conjunction with the accompanying drawings.

Figure 1:
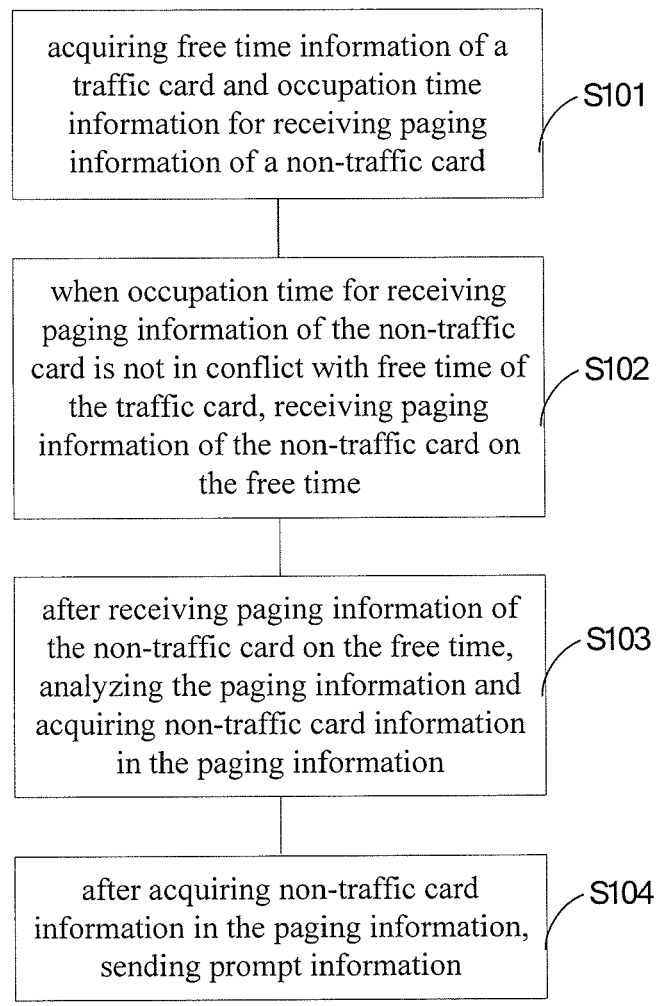
FIG. 1 is a flow chart of a method for receiving paging information in an embodiment of the present invention.

FIG. 1 is a flow chart of a method for receiving paging information in an embodiment of the present invention. As shown in FIG. 1, the method for receiving paging information includes:

S101, acquiring free time information of a traffic card and occupation time information for receiving paging information of a non-traffic card; and S102, when occupation time for receiving paging information of the non-traffic card is not in conflict with free time of the traffic card, receiving paging information of the non-traffic card on the free time.

In the above steps, the free time information of the traffic card includes traffic frame boundary time-point on a traffic channel (the traffic frame boundary time-point is the starting time-point of each traffic frame). Free time of the traffic card can be calculated with the traffic frame boundary time-point on the traffic channel of the traffic card. Traffic frame finish time-point can be calculated with traffic frame boundary time-point on the traffic channel of the traffic card and time of each frame (the time of each frame is normally a fixed time and is known). Time between the traffic frame finish time-point and the traffic frame boundary time-point on the traffic channel of the traffic card is the free time of the traffic card (in detail, the free time is a summary of time between a previous traffic frame finish time-point and a next traffic frame boundary time-point on the traffic channel of the traffic card).

The occupation time information for receiving paging information of the non-traffic card includes control frame boundary time-point on a control channel of the non-traffic card (the control frame boundary time-point is the starting time-point of each control frame). The occupation time for receiving paging information of the non-traffic card can be calculated with the control frame boundary time-point on the control channel of the non-traffic card. Control frame finish time-point can be calculated with the control frame boundary time-point on the control channel of the non-traffic card and time of each frame. Time between the control frame boundary time-point and the control frame finish time-point on the control channel of the non-traffic card is the occupation time for receiving paging information of the non-traffic card (in detail, the occupation time is a summary of time between a previous control frame finish time-point and a next control frame finish time-point on the control channel of the non-traffic card).

After step S102, necessary steps of the method for receiving paging information in this embodiment are finished. In some embodiments of the present invention, the method further includes step S103: after receiving paging information of the non-traffic card on the free time, analyzing the paging information and acquiring non-traffic card information in the paging information. The non-traffic card information includes IMSI (International Mobile Subscriber Identity) or TMSI (Temporary Mobile Subscriber Identity) related to the non-traffic card. From the IMSI/TMSI, the non-traffic card corresponding to the paging information can be identified.

After step S103, in some embodiments of the present invention, the method further includes step S104: after acquiring non-traffic card information in the paging information, sending prompt information. The prompt information can be a sound, sounds or a short period of music, which is to inform the user that paging information of the non-traffic card is received when the traffic card is in traffic (in service). The prompt information can also be shown on the cell phone. To avoid affecting the traffic card, the prompt information can be sent after the traffic (service) of the traffic card.

In embodiments of the present invention, the above method is to receive paging information of non-traffic card when traffic card is in traffic (service); since the communication system is multi-card multi-standby single-path system, there can be only one traffic card, but one or more non-traffic card. The process of receiving paging information of non-traffic card by traffic card's free time is described below.

Figure 2:
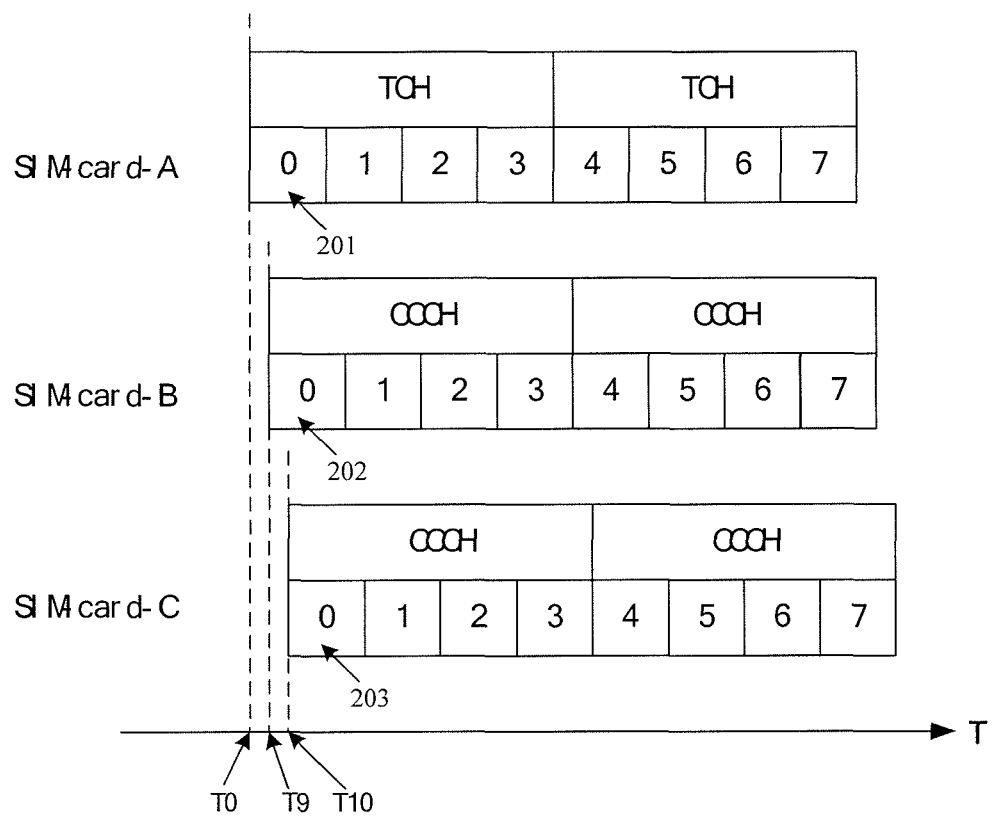
FIG. 2 is a schematic diagram of the frame boundary time-point on logical channel of traffic card and non-traffic card.

FIG. 2 is a schematic diagram of the frame boundary time-point on logical channel of traffic card and non-traffic card.

Referring to FIG. 2, for example in a multi-card multi-standby single-path system, there are 3 SIM cards, which are SIM-card-A, SIM-card-B and SIM-card-C. When there is no incoming traffic (service), three cards in turn use one communication system to receive paging information. Then, suppose at a time, paging information of SIM-card-A is received, which indicates that there is an incoming call. When the user answers the incoming call and starts a voice service, SIM-card-A is now called a traffic card, and SIM-card-B and SIM-card-C are called non-traffic cards. For a voice service, SIM-card-A normally occupies 2 time slots; one time slot is for an uplink channel, the other one is for a downlink channel; from the perspective of logical channel, both channels are traffic channels (TCH).

FIG. 2 shows 8 TCH frame of SIM-card-A. The first frame is Frame-Zero 201, which has a frame boundary time-point of T0. SIM-card-B and SIM-card-C use the common control channel (CCCH) to receive paging information. FIG. 2 also shows 8 CCCH frame of SIM-card-B and 8 CCCH frame of SIM-card-C. The first frame of SIM-card-B is Frame-Zero 202, which has a frame boundary time-point of T9. The first frame of SIM-card-C is Frame-Zero 203, which has a frame boundary time-point of T10. The frame boundary time-point is the starting time-point of each frame. T0, T9 and T10 are marked on the timeline T.

Figure 3:
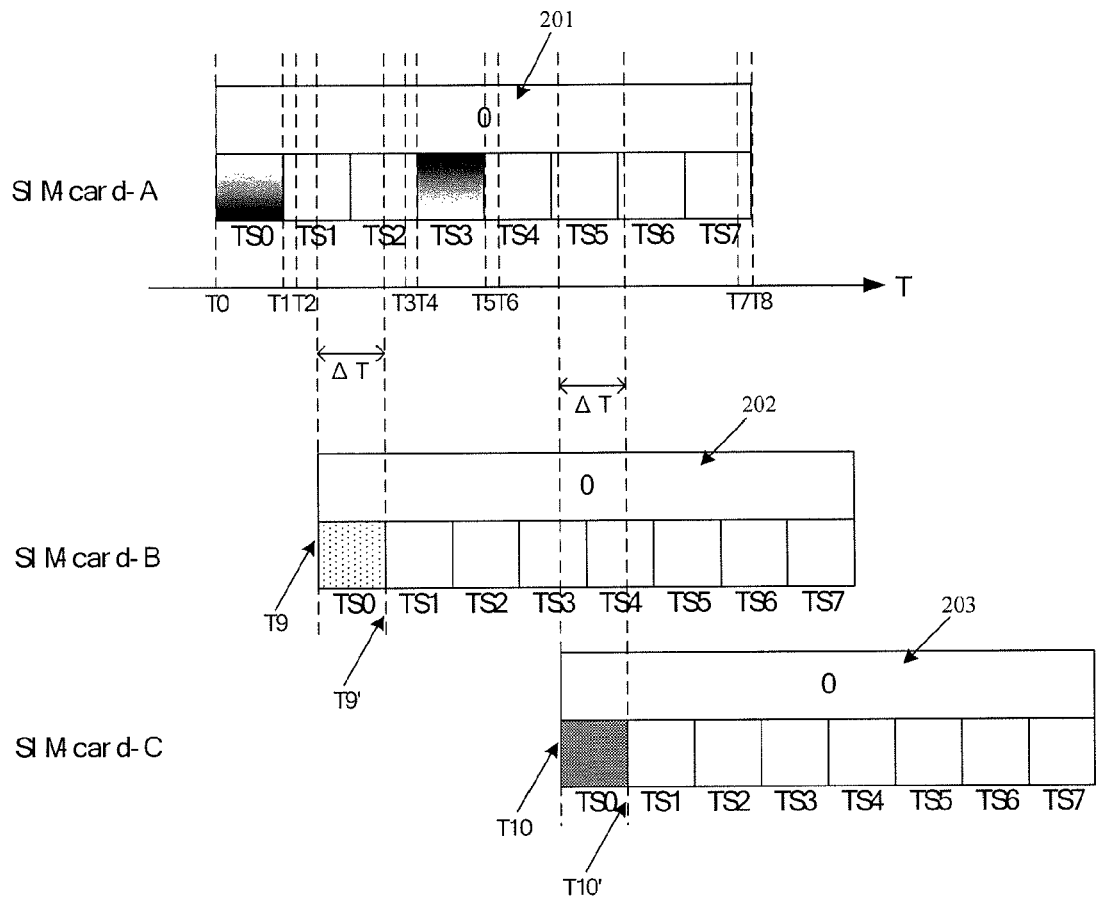
FIG. 3 is a schematic diagram of the conflict detection between the occupation time for receiving paging information of the non-traffic card and free time.

The time slot corresponding to the first frame of each card is shown in FIG. 3. FIG. 3 is a schematic diagram of the conflict detection between the occupation time for receiving paging information of the non-traffic card and free time of the traffic card. Referring to FIG. 3, Frame-Zero 201, which is the first frame of SIM-card-A, has 8 time slots, including TS0~TS7. Suppose that, when SIM-card-A is in traffic, the base station allocates TS0 to SIM-card-A as a downlink channel and TS3 to SIM-card-A as an uplink channel. In real practice, the downlink channel and the uplink channel of SIM-card-A are normally at different frequency points, therefore in different TDMA frames. However, it is normal to combine the downlink channel and the uplink channel into one TDMA frame to show the time slot occupation status of the traffic card. On the timeline T which shows the frame boundary time-point, T0 indicates the starting time point of TS0 during which Frame-Zero 201 occupies the channel; therefore, T0 is also the frame boundary time-point of Frame-Zero 201 of SIM-card-A. The end time point of TS0 is indicated by T1. Similarly, the starting time point and end time point of TS3 is indicated by T4 and T5 respectively. Since TS3 is used as an uplink channel of the traffic frame, T4 is the traffic frame boundary time-point of the uplink channel of SIM-card-A. T8 indicates the end time point of TS7. Referring to FIG. 3, TS0 and TS3, as traffic channels, have been occupied by the traffic card (SIM-card-A). Therefore, TS1, TS2, TS4, TS5, TS6 and TS7 are free time slots for SIM-card-A; and these time slots together are the free time of SIM-card-A. Specifically, the free time includes time between T1 and T4 and time between T5 and T8. There is no traffic for SIM-card-A during the free time. Therefore, SIM-card-B and SIM-card-C can use the free time of SIM-card-A to receive paging information.

Therefore, if SIM-card-B and SIM-card-C are to receive paging information, the occupation time for receiving paging information of SIM-card-B and SIM-card-C should not be in conflict with the traffic time of SIM-card-A. Referring to FIG. 2 and FIG. 3, the frame boundary time-point of Frame-Zero 202 of SIM-card-B is T9. SIM-card-B usually receives paging information by TS0 as control channel, therefore, occupation time for receiving paging information of SIM-card-B is a time period $\Delta T$ which is a time slot from T9 and is 0.557 ms (15/26 ms) specifically. The occupation time for receiving paging information of SIM-card-B should not be in conflict with the traffic time of SIM-card-A means that $\Delta T$ should not overlap with TS0 or TS3. That is to say that $\Delta T$ should not partially or totally overlap with time between T0 and T1, and $\Delta T$ should not partially or totally overlap with time between T4 and T5. Similarly, the frame boundary time-point of Frame-Zero 203 of SIM-card-C is T10. SIM-card-C normally receives paging information by TS0 as control channel. A time period $\Delta T$ which is a time slot from T10 should not overlap with TS0 or TS3. That is to say that $\Delta T$ should not partially or totally overlap with time between T0 and T1, and $\Delta T$ should not partially or totally overlap with time between T4 and T5. Furthermore, occupation time for receiving paging information of SIM-card-C should not overlap with occupation time for receiving paging information of SIM-card-B. It means that the time period $\Delta T$ which is a time slot from T10 should not partially or totally overlap with the time period $\Delta T$ which is a time slot from T9.

Referring to FIG. 3, T9' is a frame finish time-point after the time period $\Delta T$ from T9. T10' is another frame finish time-point after the time period $\Delta T$ from T10. In detail, to determine if occupation time for receiving paging information of SIM-card-B is in conflict with the traffic time of SIM-card-A (to determine if $\Delta T$ is partially or totally overlap with time between T0 and T1 or with time between T4 and T5) can be accomplished by determining if T9 or T9' is within the region from T0 to T1 or within the region from T4 to T5. If T9 or T9' is within the regions, occupation time for receiving paging information of SIM-card-B is in conflict with the traffic time of SIM-card-A; if not within the regions, occupation time for receiving paging information of SIM-card-B is not in conflict with the traffic time of SIM-card-A, which also means that occupation time for receiving paging information of SIM-card-B is not in conflict with the free time of SIM-card-A. Similarly, to determine if occupation time for receiving paging information of SIM-card-C is in conflict with the traffic time of SIM-card-A can be accomplished by determining if T10 or T10' is within the region from T0 to T1 or within the region from T4 to T5. There is a further need to determine if occupation time for receiving paging information of SIM-card-C is in conflict with occupation time for receiving paging information of SIM-card-B; it means that the $\Delta T$ from T10 should not partially or totally overlap with the $\Delta T$ from T9; the determining process can be accomplished by determining if T10 or T10' is within the region from T9 to T9'. If T10 or T10' is within the region from T9 to T9', occupation time for receiving paging information of SIM-card-C is in conflict with occupation time for receiving paging information of SIM-card-B, and SIM-card-C can not use the time period from T10 to T10' to receive paging information; if not within the region from T9 to T9', (and not within the region from T0 to T1 or within the region from T4 to T5), occupation time for receiving paging information of SIM-card-C is not in conflict with occupation time for receiving paging information of SIM-card-B, and SIM-card-C can use the time period from T10 to T10' to receive paging information.

In addition, since SIM-card-A, SIM-card-B and SIM-card-C are normally at different frequency points, receiving paging information of SIM-card-B or SIM-card-C on the free time of SIM-card-A requires switching frequency point by the RF chip of the cell phone. The switching frequency point needs certain stabilization time, which is called protecting time. The protecting time is within the free time. Referring to FIG. 3, SIM-card-A occupies TS0 at a frequency point, which is from T0 to T1; later, it is needed to switch to a frequency point of SIM-card-B or SIM-card-C, and paging information is received in TS0 at the frequency point of SIM-card-B or SIM-card-C; time period from T1 to T2 is the protecting time. Similarly, protecting time in FIG. 3 also includes time period from T3 to T4, time period from T5 to T6, and time period from T7 to T8. The protecting time in the free time of SIM-card-A is to guarantee stabilization time for switching frequency point. Therefore, it is also required that the occupation time for receiving paging information of the non-traffic card (SIM-card-B or SIM-card-C) is not in conflict with the protecting time; that is to say the ΔT should not partially or totally overlap with any one of the time period from T1 to T2, T3 to T4, T5 to T6 and T7 to T8.

In practices, to determine if the occupation time for receiving paging information of the non-traffic card (SIM-card-B or SIM-card-C) is in conflict with the protecting time or to determine if the ΔT partially or totally overlaps with any one of the time period from T1 to T2, T3 to T4, T5 to T6 and T7 to T8 can be accomplished by determining if any of T9, T9', T10 and T10' is within one of the time period from T1 to T2, T3 to T4, T5 to T6 and T7 to T8. If one of T9, T9', T10 and T10' is within the time periods, occupation time for receiving paging information of the non-traffic card (SIM-card-B and/or SIM-card-C) is in conflict with the protecting time; if not, occupation time for receiving paging information of the non-traffic card (SIM-card-B or SIM-card-C) is not in conflict with the protecting time.

In conclusion, to detect the conflict between the occupation time for receiving paging information of the non-traffic card and the free time includes: occupation time for receiving paging information of the non-traffic card should not be in conflict with the traffic time of the traffic card, and should not be in conflict with the protecting time in the free time of the traffic card. Referring to FIG. 3, the conflict detection is passed only when the ΔT for receiving paging information of SIM-card-B or SIM-card-C is within the time period from T2 to T3 or T6 to T7; and paging information of SIM-card-B or SIM-card-C is then received on the free time of SIM-card-A.

It is also possible that the non-traffic card and the traffic card are at the same frequency point; then, switching frequency point is not necessary and the protecting time is not needed. Under this condition, the channel allocated for the traffic card is normally not TS0. For example, the channels for the traffic card are TS1 and TS4; TS0 can still be used to receive paging information of the non-traffic card. If the channels for the traffic card are TS0 and TS3, paging information of the non-traffic card can not be received.

Because of the frequency hopping of the frequency point occupied by the traffic card, the frequency point may change when the traffic card is in traffic (service). In addition, the frequency point occupied by the traffic card may be from one cell or different cells. Because a communication network is composed of multiple cellular base stations, when the traffic card is in traffic, the user in moving status may change the corresponding cell from one to another, which causes the change of the frequency point occupied by the traffic card. Although time slots for the traffic card won't change when frequency point changes, the starting time point of TS0 and the traffic frame boundary time-point on the occupied traffic channel may change, this causes the change of the free time. Therefore, under this circumstance, conflict detection between the occupation time for receiving paging information of the non-traffic card and the free time needs to be done again. For example, when SIM-card-A is in a voice service, frequency point occupied may change because of frequency hopping. At this time, time slots for SIM-card-A do not change, which are still TS0 and TS3. However, since the frequency point occupied by SIM-card-A changed, the starting time point of TS0 and the traffic frame boundary time-point on the occupied traffic channel may change. Therefore, the conflict detection between the occupation time for receiving paging information and the free time needs to be done again. In addition, when SIM-card-A is in a voice service, the user in moving status from one place to another may change the corresponding cell from one to another, and the change of signal strength may change the corresponding cell from one to another. Adjacent cells have different frequency points. Therefore, although time slots for the traffic of SIM-card-A won't change, the frequency point occupied by SIM-card-A changed. The starting time point of TS0 and the traffic frame boundary time-point on the occupied traffic channel may change, and the conflict detection between the occupation time for receiving paging information and the free time needs to be done again.

During the time period of a TDMA frame, if the occupation time for receiving paging information is in conflict with the free time, the paging information of the non-traffic card can not be received. The non-traffic card continues to wait (the conflict detection between the occupation time for receiving paging information and the free time may be performed again because of frequency hopping) until the occupation time for receiving paging information is not in conflict with the free time (of course, the waiting time should be less than the traffic time of the traffic card). And then, the paging information of the non-traffic card (SIM-card-B and/or SIM-card-C) is received on the free time. After receiving the paging information, a paging response is sent back to the base station; then, the base station does not have to re-broadcast this paging information, and the calling party knows that the called party is busy with other services.

If paging information of SIM-card-B and SIM-card-C is received on the free time, when SIM-card-A is in traffic. The paging information of SIM-card-B and SIM-card-C is analyzed to acquire the non-traffic card information in the paging information. The non-traffic card information includes the IMSI/TMSI of SIM-card-B and SIM-card-C. From the IMSI/TMSI, the non-traffic card corresponding to the paging information can be identified.

Figure 4:
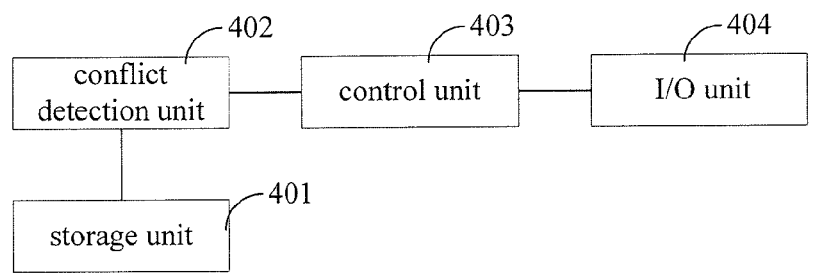
FIG. 4 is a schematic diagram of an apparatus for receiving paging information in another embodiment of the present invention.

Based on the above method for receiving paging information, there is also provided an apparatus for receiving paging information in the present invention. FIG. 4 is a schematic diagram of an apparatus for receiving paging information in another embodiment of the present invention. Referring to FIG. 4, the apparatus for receiving paging information includes a storage unit 401, a conflict detection unit 402, a control unit 403 and an I/O unit 404. The storage unit 401 is adapted to store free time information of a traffic card and occupation time information for receiving paging information of a non-traffic card. The conflict detection unit 402 is adapted to acquire free time information of the traffic card and occupation time information for receiving paging information of the non-traffic card from the storage unit 401, and adapted to detect conflict between the occupation time for receiving paging information of the non-traffic card and the free time of the traffic card. The control unit 403 is adapted to control the I/O unit 404 to receive paging information of the non-traffic card on the free time when occupation time for receiving paging information of the non-traffic card is not in conflict with the free time of the traffic card. The I/O unit 404 is adapted to receive paging information of the non-traffic card under the control of the control unit 403.

In practices, storage unit 401 stores frame boundary time-point information on logical channels used by the traffic card and non-traffic card (which includes control frame boundary time-point information on the CCCH of the cell corresponding to the traffic card before the traffic card is in traffic, and includes control frame boundary time-point information on the CCCH of the cell corresponding to the non-traffic card). The storage unit 401 also stores free time information of the traffic card and occupation time information for receiving paging information of the non-traffic card. The free time of the traffic card and the occupation time for receiving paging information of the non-traffic card can be acquired from the free time information of the traffic card and occupation time information for receiving paging information of the non-traffic card (the free time information of the traffic card includes traffic frame boundary time-point on a traffic channel of the traffic card and traffic frame finish time-point calculated with the traffic frame boundary time-point and time of each frame, time between the traffic frame finish time-point and the traffic frame boundary time-point on the traffic channel of the traffic card is the free time of the traffic card; similarly, occupation time information for receiving paging information of the non-traffic card includes control frame boundary time-point on a control channel of the non-traffic card and control frame finish time-point calculated with the control frame boundary time-point and time of each frame, time between the control frame boundary time-point and the control frame finish time-point on the control channel of the non-traffic card is the occupation time for receiving paging information of the non-traffic card). When the traffic card starts a new traffic (service), the conflict detection unit 402 is triggered by a predefined trigger mechanism. The conflict detection unit 402 acquires the free time information of the traffic card and the occupation time information for receiving paging information of the non-traffic card from the storage unit 401, and performs conflict detection. When detection result shows that occupation time for receiving paging information of the non-traffic card is not in conflict with free time of the traffic card, the detection result is sent to the control unit 403 (detection result, which shows that occupation time for receiving paging information of the non-traffic card is in conflict with free time of the traffic card, is not sent to the control unit 403). The control unit 403 sends out control instructions which control the I/O unit 404 to receive paging information of the non-traffic card on the free time of the traffic card. The I/O unit 404 includes RF module, which is adapted to receive or send communication signals and to switch frequency point when the frequency point for receiving and sending changes.

Figure 5:
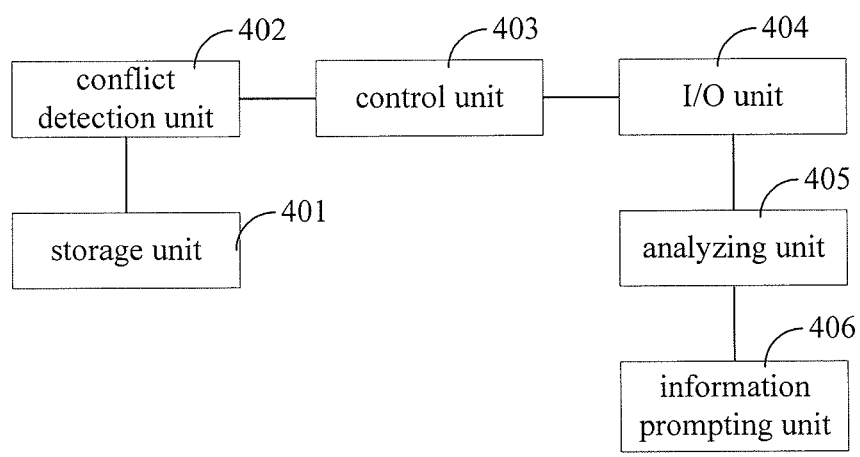
FIG. 5 is a schematic diagram of an apparatus for receiving paging information in still another embodiment of the present invention.

FIG. 5 is a schematic diagram of an apparatus for receiving paging information in still another embodiment of the present invention. Referring to FIG. 5, the apparatus for receiving paging information includes a storage unit 401, a conflict detection unit 402, a control unit 403 and an I/O unit 404, and further includes an analyzing unit 405 and an information prompting unit 406. The analyzing unit 405 is adapted to analyze received paging information of the non-traffic card, and adapted to acquire non-traffic card information in the paging information. The information prompting unit 406 is adapted to send prompt information after the analyzing unit 405 analyzing received paging information of the non-traffic card and acquiring the non-traffic card information in the paging information. The analyzing unit 405 has a communication protocol stack. After receiving the paging information from the I/O unit 404, the communication protocol stack is invoked to analyze the paging information and to acquire non-traffic card information in the paging information. For example, the non-traffic card information includes IMSI/TMSI. The non-traffic card information is used to identify the non-traffic card corresponding to the paging information. Then, information prompting unit 406 sends prompt information. The prompt information may include the card number of the non-traffic card which receives the paging information.

In some embodiments of the present invention, the apparatus for receiving paging information is a multi-card multi-standby mobile communication apparatus, such as conventional dual-card dual-standby cell phones and triple-card triple-standby cell phones. The detailed process for the apparatus to receive paging information of a non-traffic card on the free time of a traffic card is the same as the above method for receiving paging information.

In conclusion, the method and apparatus for receiving paging information provided in the above embodiments of the present invention have the following advantages:

When a traffic card is in traffic (service), paging information of a non-traffic card can be received, which helps identify if the non-traffic card has incoming service (incoming traffic);

the method and apparatus for receiving paging information enable receiving paging information of a non-traffic when a traffic card is in traffic (service), which improves the multi-card multi-standby system.

Although the present invention has been illustrated and described with reference to the preferred embodiments of the present invention, those ordinary skilled in the art shall appreciate that various modifications in form and detail may be made without departing from the spirit and scope of the invention.

What is claimed is:

1. A method for receiving paging information in a multi-card multi-standby mobile communication apparatus, comprising performing a conflict detection between occupation time for receiving paging information of a non-traffic card and free time information of a traffic card, where the conflict detection comprises:

acquiring free time information of a traffic card and occupation time information for receiving paging information of a non-traffic card; and receiving paging information of the non-traffic card during the free time of the traffic card when the traffic card is in traffic, when occupation time for receiving paging information of the non-traffic card is not in conflict with free time of the traffic card;

where the traffic card is a SIM card in traffic, the non-traffic card is a SIM card not in traffic, the free time is the time not occupied by the traffic card for the traffic, and the occupation time is the time to be occupied by the non-traffic card for receiving paging information;

where occupation time for receiving paging information of the non-traffic card is not in conflict with free time of the traffic card comprises: occupation time for receiving the paging information of the non-traffic card is within the free time of the traffic card, and occupation time for receiving the paging information of the non-traffic card does not overlap with occupation time for receiving paging information of all other non-traffic card in the multi-card multi-standby mobile communication apparatus;

where the free time of the traffic card comprises protecting time, which is used to guarantee stabilization time for switching frequency point; occupation time for receiving paging information of the non-traffic card is not in conflict with free time of the traffic card further comprises: occupation time for receiving paging information of the non-traffic card not occupying the protecting time.

2. The method of claim 1, wherein the acquiring free time information of the traffic card includes: acquiring traffic frame boundary time-point on a traffic channel of the traffic card and traffic frame finish time-point calculated with the traffic frame boundary time-point and time of each frame, time between the traffic frame finish time-point and the traffic frame boundary time-point on the traffic channel of the traffic card being the free time of the traffic card; and the acquiring occupation time information for receiving paging information of the non-traffic card includes: acquiring control frame boundary time-point on a control channel of the non-traffic card and control frame finish time-point calculated with the control frame boundary time-point and time of each frame, time between the control frame boundary time-point and the control frame finish time-point on the control channel of the non-traffic card being the occupation time for receiving paging information of the non-traffic card.

3. The method of claim 1, wherein occupation time for receiving paging information of the non-traffic card not occupying the protecting time is determined by the control frame boundary time-point on the control channel of the non-traffic card.

4. The method of claim 3, wherein occupation time for receiving paging information of the non-traffic card not occupying the protecting time is determined by the control frame boundary time-point on the control channel of the non-traffic card includes:

calculating control frame finish time-point with the control frame boundary time-point on the control channel of the non-traffic card and time of each frame;

determining that occupation time for receiving paging information of the non-traffic card does not occupy the protecting time when the control frame boundary time-point or the control frame finish time-point on the control channel of the non-traffic card is not within the protecting time.

5. The method of claim 1, further comprising:

after receiving paging information of the non-traffic card on the free time, analyzing the paging information and acquiring non-traffic card information in the paging information.

6. The method of claim 5, further comprising:

after acquiring non-traffic card information in the paging information, sending prompt information.

7. The method of claim 1, wherein a number of the traffic card is one, and a number of the non-traffic card is one or more than one.

8. The method of claim 1, wherein a communication network of the traffic card and the non-traffic card is a TDMA communication network.

9. The method of claim 1, further comprising: if the frequency point occupied by the traffic card changes when the traffic card is in traffic, the conflict detection between occupation time for receiving paging information of a non-traffic card and free time information of a traffic card is performed again.

10. The method of claim 1, further comprising: if the occupation time for receiving paging information of the non-traffic card is in conflict with the free time of the traffic card, the non-traffic card continues to wait until the occupation time for receiving paging information is not in conflict with the free time.

11. An apparatus for receiving paging information, comprising:

a storage unit, a conflict detection unit, a control unit and an I/O unit;

the storage unit being adapted to store free time information of a traffic card and occupation time information for receiving paging information of a non-traffic card, where the traffic card is a SIM card in traffic, the non-traffic card is a SIM card not in traffic, the free time is the time not occupied by the traffic card for the traffic, and the occupation time is the time to be occupied by the non-traffic card for receiving paging information;

the conflict detection unit being adapted to acquire free time information of the traffic card and occupation time information for receiving paging information of the non-traffic card from the storage unit, and adapted to detect conflict between the occupation time for receiving paging information of the non-traffic card and the free time of the traffic card;

the control unit being adapted to control the I/O unit to receive paging information of the non-traffic card on the free time of the traffic card when the traffic card is in traffic, when occupation time for receiving paging information of the non-traffic card is not in conflict with the free time of the traffic card;

the I/O unit being adapted to receive paging information of the non-traffic card under a control of the control unit, where occupation time for receiving paging information of the non-traffic card is not in conflict with free time of the traffic card comprises: occupation time for receiving the paging information of the non-traffic card is within the free time of the traffic card, and occupation time for receiving the paging information of the non-traffic card does not overlap with occupation time for receiving paging information of all other non-traffic card in the apparatus;

where the free time of the traffic card comprises protecting time, which is used to guarantee stabilization time for switching frequency point; occupation time for receiving paging information of the non-traffic card is not in conflict with free time of the traffic card further comprises: occupation time for receiving paging information of the non-traffic card not occupying the protecting time.

12. The apparatus of claim 11, wherein acquiring the free time information of the traffic card by the conflict detection unit includes: acquiring traffic frame boundary time-point on a traffic channel of the traffic card and traffic frame finish time-point calculated with the traffic frame boundary time-point and time of each frame, time between the traffic frame finish time-point and the traffic frame boundary time-point on the traffic channel of the traffic card being the free time of the traffic card; and acquiring the occupation time information for receiving paging information of the non-traffic card by the conflict detection unit includes: acquiring control frame boundary time-point on a control channel of the non-traffic card and control frame finish time-point calculated with the control frame boundary time-point and time of each frame, time between the control frame boundary time-point and the control frame finish time-point on the control channel of the non-traffic card being the occupation time for receiving paging information of the non-traffic card.

13. The apparatus of claim 11, wherein occupation time for receiving paging information of the non-traffic card not occupying the protecting time is determined by the control frame boundary time-point on the control channel of the non-traffic card.

14. The apparatus of claim 13, wherein occupation time for receiving paging information of the non-traffic card not occupying the protecting time is determined by the control frame boundary time-point on the control channel of the non-traffic card includes:

calculating control frame finish time-point with the control frame boundary time-point on the control channel of the non-traffic card and time of each frame;

determining that occupation time for receiving paging information of the non-traffic card does not occupy the protecting time when the control frame boundary time-point or the control frame finish time-point on the control channel of the non-traffic card is not within the protecting time.

15. The apparatus of claim 11, further comprising an analyzing unit, the analyzing unit being adapted to analyze received paging information of the non-traffic card and acquire non-traffic card information in the paging information.

16. The apparatus of claim 15, further comprising an information prompting unit, the information prompting unit being adapted to send prompt information after the analyzing unit analyzes received paging information of the non-traffic card and acquires the non-traffic card information in the paging information.

17. The apparatus of claim 11, wherein the apparatus for receiving paging information is a multi-card multi-standby mobile communication apparatus.

18. The apparatus of claim 17, wherein the apparatus for receiving paging information is a triple-card triple-standby cell phone.

19. The apparatus of claim 11, where if the frequency point occupied by the traffic card changes when the traffic card is in traffic, the conflict detection unit is adapted to acquire again free time information of the traffic card and occupation time information for receiving paging information of the non-traffic card from the storage unit, and to detect again conflict between the occupation time for receiving paging information of the non-traffic card and the free time of the traffic card.

20. The apparatus of claim 11, where if the occupation time for receiving paging information of the non-traffic card is in conflict with the free time of the traffic card, the control unit is adapted to control the I/O unit to wait until the occupation time for receiving paging information is not in conflict with the free time.

* * * * *